(12) United States Patent
Akitsune et al.

(10) Patent No.: US 7,009,619 B2
(45) Date of Patent: Mar. 7, 2006

(54) MAP DISPLAY DEVICE, MAP DISPLAY SYSTEM, MAP DISPLAY METHOD, AND MAP DISPLAY PROGRAM PRODUCT

(75) Inventors: Hideaki Akitsune, Koshigaya (JP); Hisaaki Emon, Saitama (JP); Tomoji Takatsu, Matsudo (JP); Motohiro Miyake, Sagamihara (JP); Kunihiro Iwasaki, Chiba (JP); Kazuo Koyama, Inagi (JP); Takashi Fujioka, Tokyo (JP)

(73) Assignee: Foundation Japan Construction Information Center, Minato Ward (JP)

( * ) Notice: Subject to any disclaimer, the term of this patent is extended or adjusted under 35 U.S.C. 154(b) by 0 days.

(21) Appl. No.: 10/860,736

(22) Filed: Jun. 3, 2004

(65) Prior Publication Data

US 2004/0246261 A1  Dec. 9, 2004

(30) Foreign Application Priority Data

Jun. 3, 2003  (JP)  ............................. 2003-158432

(51) Int. Cl.
*G09G 5/00*  (2006.01)
(52) U.S. Cl. ...................... 345/581; 345/619; 345/574; 382/305; 715/700; 715/734
(58) Field of Classification Search ................ 345/581, 345/618–619, 440, 440.2, 441, 442–443, 345/549, 552, 574, 204, 953, 960, 965, 968, 345/629–631; 382/253–254, 286, 305; 715/700, 715/733, 732, 734, 737; 455/556.2, 566, 455/95
See application file for complete search history.

(56) References Cited

U.S. PATENT DOCUMENTS

| | | | | |
|---|---|---|---|---|
| 6,262,741 | B1 * | 7/2001 | Davies | ....................... 345/423 |
| 6,577,714 | B1 * | 6/2003 | Darcie et al. | ............ 379/93.17 |
| 2001/0045949 | A1 * | 11/2001 | Chithambaram et al. | ... 345/418 |
| 2004/0117358 | A1 * | 6/2004 | von Kaenel et al. | ............ 707/3 |
| 2004/0157641 | A1 * | 8/2004 | Chithambaram et al. | 455/556.2 |

FOREIGN PATENT DOCUMENTS

| | | |
|---|---|---|
| JP | 11-219426 | 8/1999 |
| JP | 2001-337879 | 12/2001 |

OTHER PUBLICATIONS

Japanese Appln. No. 2003-158432 search report dated Jul. 26, 2005.

* cited by examiner

*Primary Examiner*—Kee M. Tung
*Assistant Examiner*—Wesner Sajous
(74) *Attorney, Agent, or Firm*—Ohlandt, Greeley, Ruggiero & Perle LLP.

(57) ABSTRACT

In the present invention, map data managed in different formats in different geographic information systems is converted into raster data and subjected to various kinds of processing to produce raster layers for freer use of the map data, such as processing and editing of the map data. A server as a map display device of the present invention has a control section. The control section controls to adjust, on the basis of attribute data, a scale and size of image data, which is stored in a storage section, in accordance with functions of an application program, to produce a plurality of raster layers, and superimpose the plurality of raster layers, and then display a map on a display section.

6 Claims, 14 Drawing Sheets

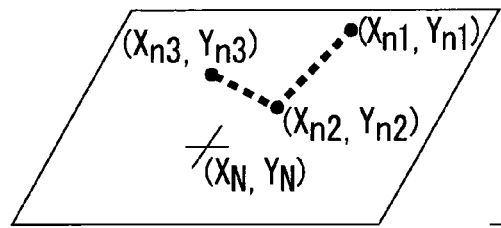 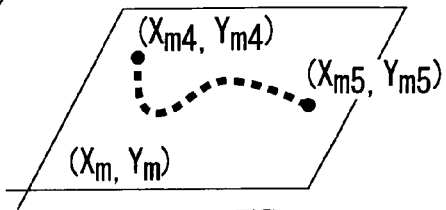
FIG. 5A  FIG. 5B
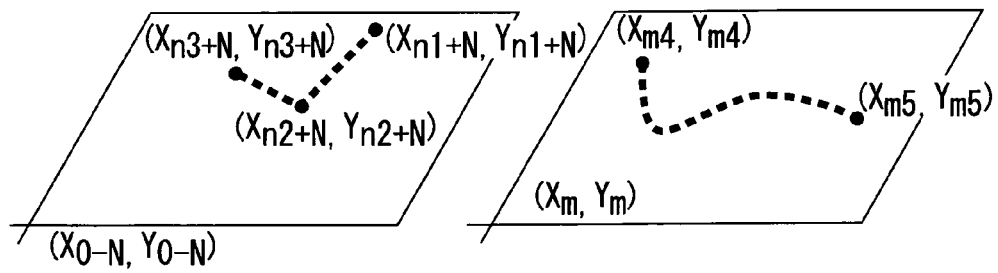
FIG. 6A  FIG. 6B
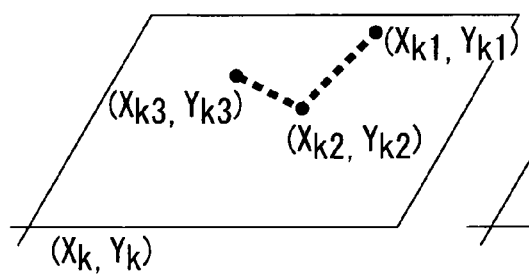 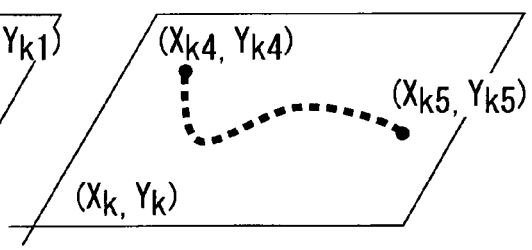
FIG. 7A  FIG. 7B
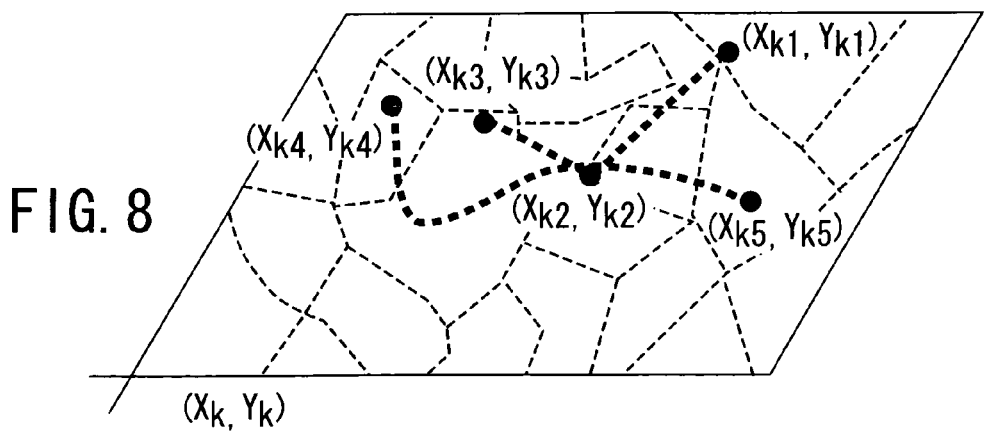
FIG. 8

MAP DISPLAY DEVICE, MAP DISPLAY SYSTEM, MAP DISPLAY METHOD, AND MAP DISPLAY PROGRAM PRODUCT

CROSS-REFERENCE TO RELATED APPLICATIONS

This application is based upon and claims the benefit of priority from prior Japanese Patent Applications No. 2003-158432, filed Jun. 3, 2003, the entire contents of which are incorporated herein by reference.

BACKGROUND OF THE INVENTION

1. Field of the Invention

The present invention relates to a device which properly displays map data in cooperation with, for example, a geographic information system, and relates, in particular, to a map display device, a map display system, and a map display method which handle raster layers corresponding to a layer structure.

2. Description of the Related Art

Currently, usually, map data is transmitted from a server to a client terminal, and is displayed on the client terminal. For example, when the map data is transmitted and received via the Internet, the map data is analyzed using a browser or the like, and displayed on a screen at the client terminal. Here, the map data generally includes raster data and vector data. Raster data is image data producing a map with many small dots, and vector data is data producing a map with line segments and graphics. When the map data is retained in the server provided in a network environment, it is often managed in the form of vector data for convenience of information retrieval and update processing.

However, when the map data is managed in the form of the vector data in the network environment as in the prior art described above, separate application software needs to be used to handle the map data because the map data of separately developed geographic information systems have their own formats. In addition, due to the different formats of map data, it is difficult to process and edit the map data or the like of different geographic information systems and display the map data correctly.

BRIEF SUMMARY OF THE INVENTION

The present invention has been attained in view of the foregoing problem, and its object is to convert map data managed in different formats in different geographic information systems into raster data, and subject it to various kinds of processing to produce raster layers for freer use of the map data, such as processing and editing of the map data.

In order to attain this object, according to one aspect of the present invention, there is provided a map display device having a control section which controls to read data stored in a storage section to generate image data, adjust a plurality of image data in accordance with attribute data to produce raster layers, superimpose a plurality of raster layers, and display a map on a display section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 5A and 5B are conceptual diagrams to explain normalization conversion processing;

FIGS. 6A and 6B are conceptual diagrams to explain the normalization conversion processing;

FIGS. 7A and 7B are conceptual diagrams to explain conversion correction processing;

FIG. 8 is a conceptual diagram to explain raster layer transmission processing;

DETAILED DESCRIPTION OF THE INVENTION

Embodiments of the present invention will hereinafter be described in reference to the drawings.

First Embodiment

Figure 1:
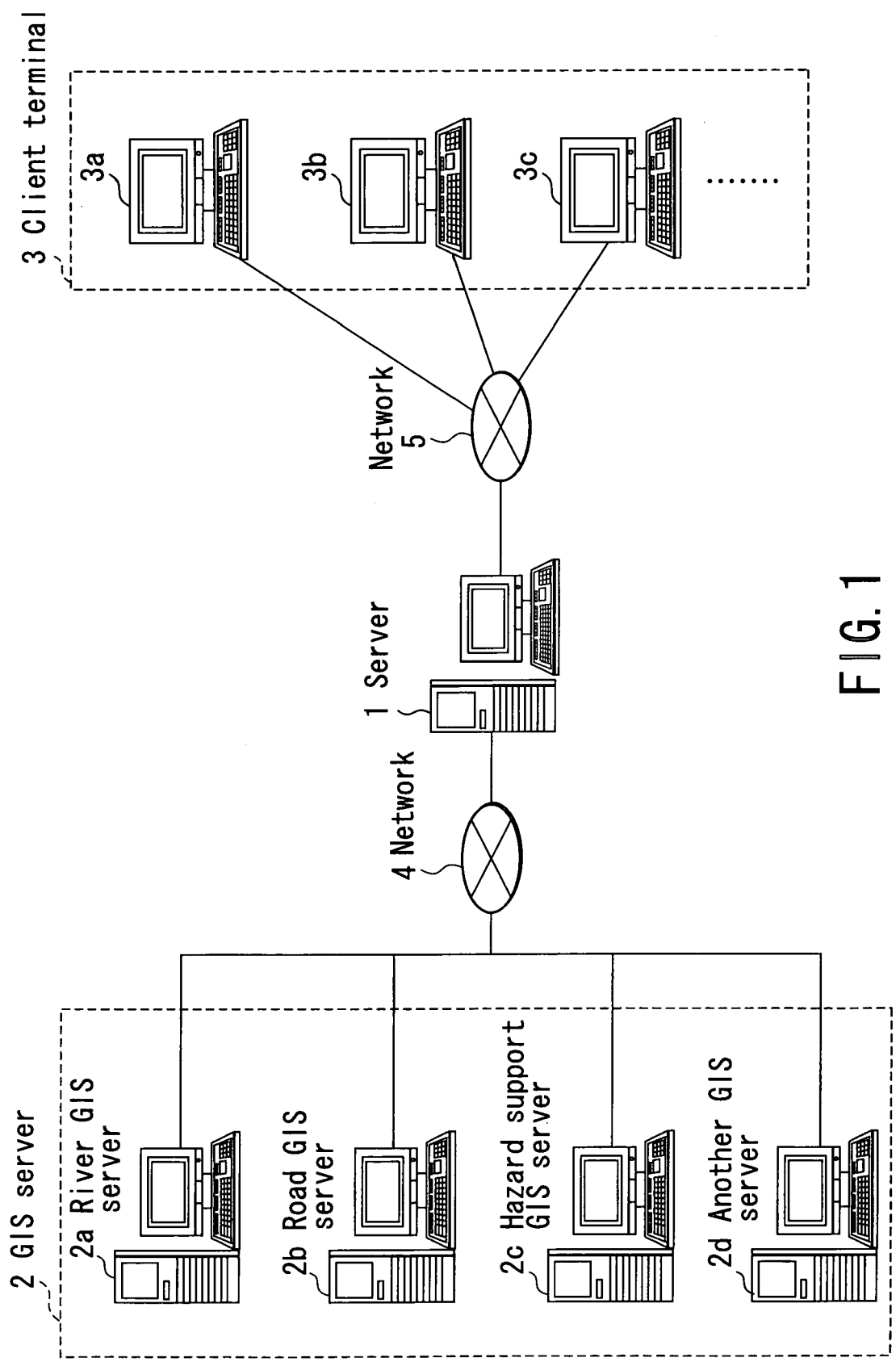
FIG. 1 is a configuration diagram of a map display system according to a first embodiment of the present invention.

First, a configuration of a map display system according to a first embodiment of the present invention is shown in FIG. 1 and will be described. The map display system basically comprises a server 1 as a map display device, and geographic information system (GIS) server 2 of various kinds. However, the map display system may have client terminals 3a, 3b, 3c . . . (these are hereinafter collectively referred to with a numeral 3) added thereto.

The GIS server 2 retains geographic position distribution states of environmental information and economic information on a database, and enables various kinds of simulations based on such information. The GIS server 2 includes a river GIS server 2a, a road GIS server 2b, a hazard support GIS server 2c, and another GIS server 2d, for example.

Furthermore, the server 1 as the map display device, and the GIS server 2 are connected via an exclusive line 4 or the like in such a manner that they can communicate. The server 1 and the client terminal 3 are connected via a network 5 such as the Internet in such a manner that they can communicate.

In addition, in the GIS server 2, files are created for the same area in accordance with contents of data such as buildings and roads, and are retained. These files individually show a map extracting only the buildings in the area, and a map depicting only the roads. Such files classified in accordance with subjects are called "layers". Further, among data representing geographic information, the data containing information other than positions and the like that represent a spatial structure (graphical information) are called attribute data. Generally, the "attribute data" is managed on a relational database and will be coupled with the graphical information when used, but it is not limited thereto.

Figure 2:
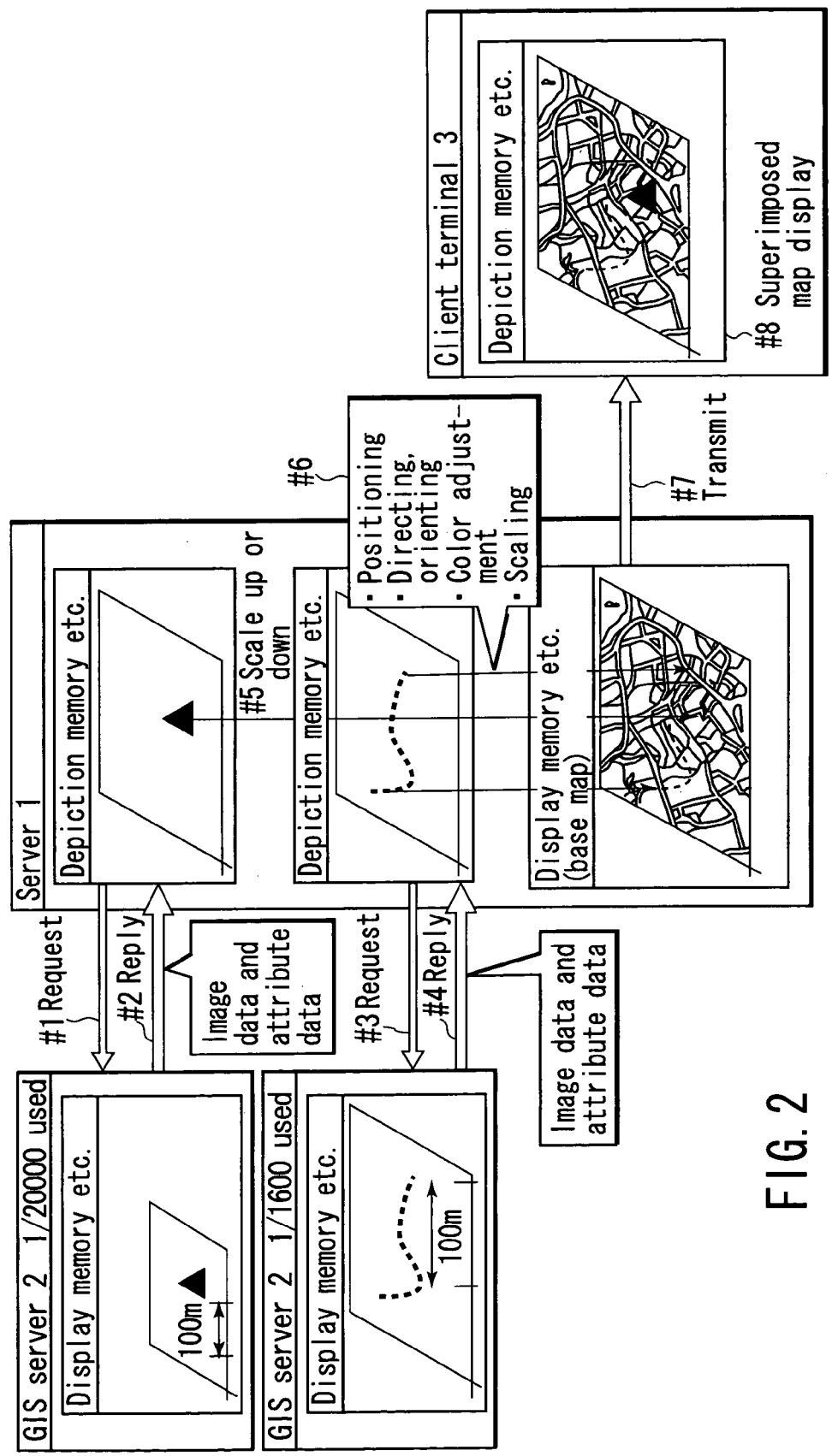
FIG. 2 is a conceptual diagram to explain an outline of a characteristic operation of the map display system according to the first embodiment of the present invention.

Here, an outline of a characteristic operation of the map display system according to the first embodiment of the present invention having the configuration as described above will be explained referring to FIG. 2.

When the server 1 makes a data acquisition request to the GIS server 2 (#1, #3), the GIS server 2 reads vector layers (numerical data) stored in an unshown database, and expands the vector layers on a display memory in the GIS server 2 to generate image data such as BMP, and then returns the image data and the attribute data to the server 1 (#2, #4). In addition, the attribute data contains data on positional information, a scale and a size, for example.

In the first embodiment, the GIS server 2 manages the map data in the form of vector layers for convenience of information retrieval and update processing, which is naturally not limited thereto. Moreover, since the vector layers are expanded on the display memory of the GIS server 2 to generate the image data, rapid output can be achieved. Because of a smaller data size than that of the vector layers, the burden imposed by the image data such as BMP on a processing system is light, and naturally, transmission time is also reduced.

The server 1 adjusts the scale and size in accordance with the received image data and attribute data, and manages the results thereof as the raster layers. Superposition of the raster layers includes normalization conversion of the map, various kinds of layer corrections, and color adjustment. The server 1 transmits the raster layers to the client terminal 3. In the client terminal 3, the raster layers are superposed and expanded on the display memory or the like, and then displayed on an unshown display section. In addition, after the raster layers are superposed at the server 1, a result of which may be sent to the client terminal 3.

Figure 3A:
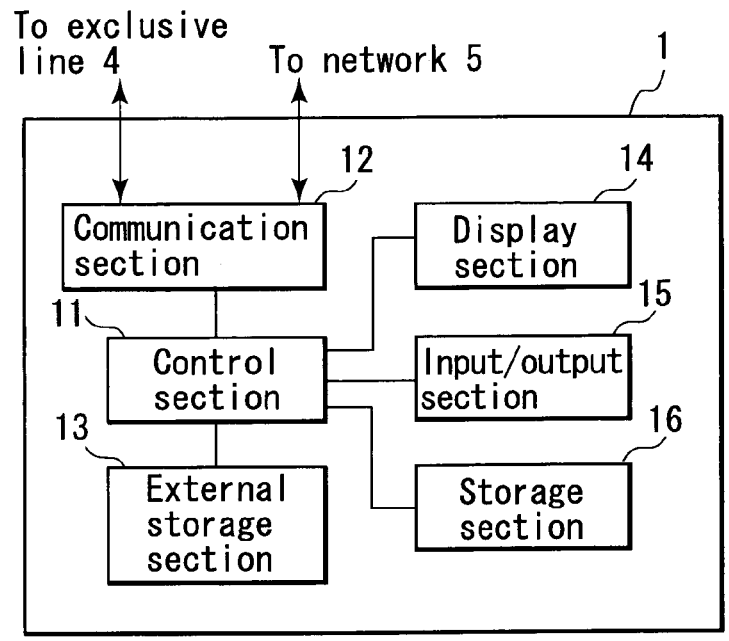
FIG. 3A is a detailed configuration diagram of a server 1.

Here, a detailed configuration of the server 1 as the map display device is as shown in FIG. 3A. As shown in FIG. 3A, in the configuration of the server 1, a control section 11 controls the entire server 1, and a communication section 12, an external storage section 13, a display section 14, an input/output section 15 and a storage section 16 are connected to the control section 11 so as to be able to communicate.

The communication section 12 communicates with the GIS server 2 via the exclusive line 4, or with the client terminal 3 via the network 5. The display section 14 actually displays a map or the like. The input/output section 15 receives various kinds of operation inputs. The storage section 16 and the external storage section 13 store data sent from an application program, the GIS server 2 or the like.

Figure 3B:
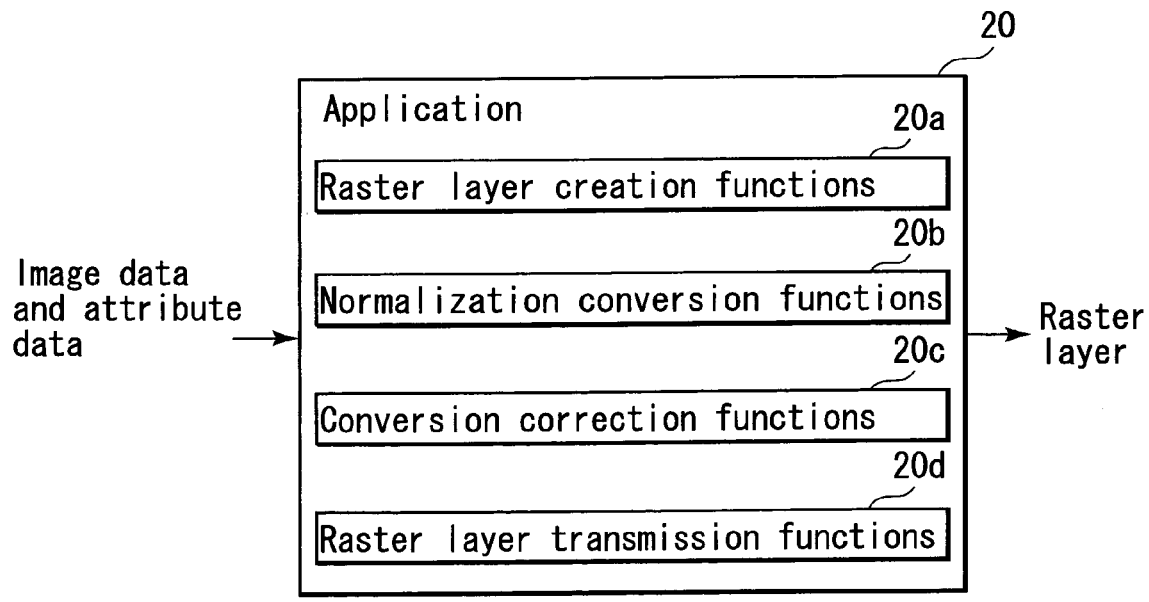
FIG. 3B is a diagram showing various kinds of functions of an application program 20 of the server 1.

Functions of an application program 20 executed by the control section 11 are shown in FIG. 3B and will be described. This application program 20 comprises a raster layer creation function 20a, a normalization conversion function 20b, a conversion correction function 20c and a raster layer transmission function 20d. When the image data and attribute data transmitted from the GIS server 2 are input, the raster layers are created by such various functions 20a to 20d of the application program 20, and will be output.

Processing of the control section 11 based on the functions 20a to 20d of the application program 20 will be described below referring to FIG. 4 to FIG. 8.

Figure 4:
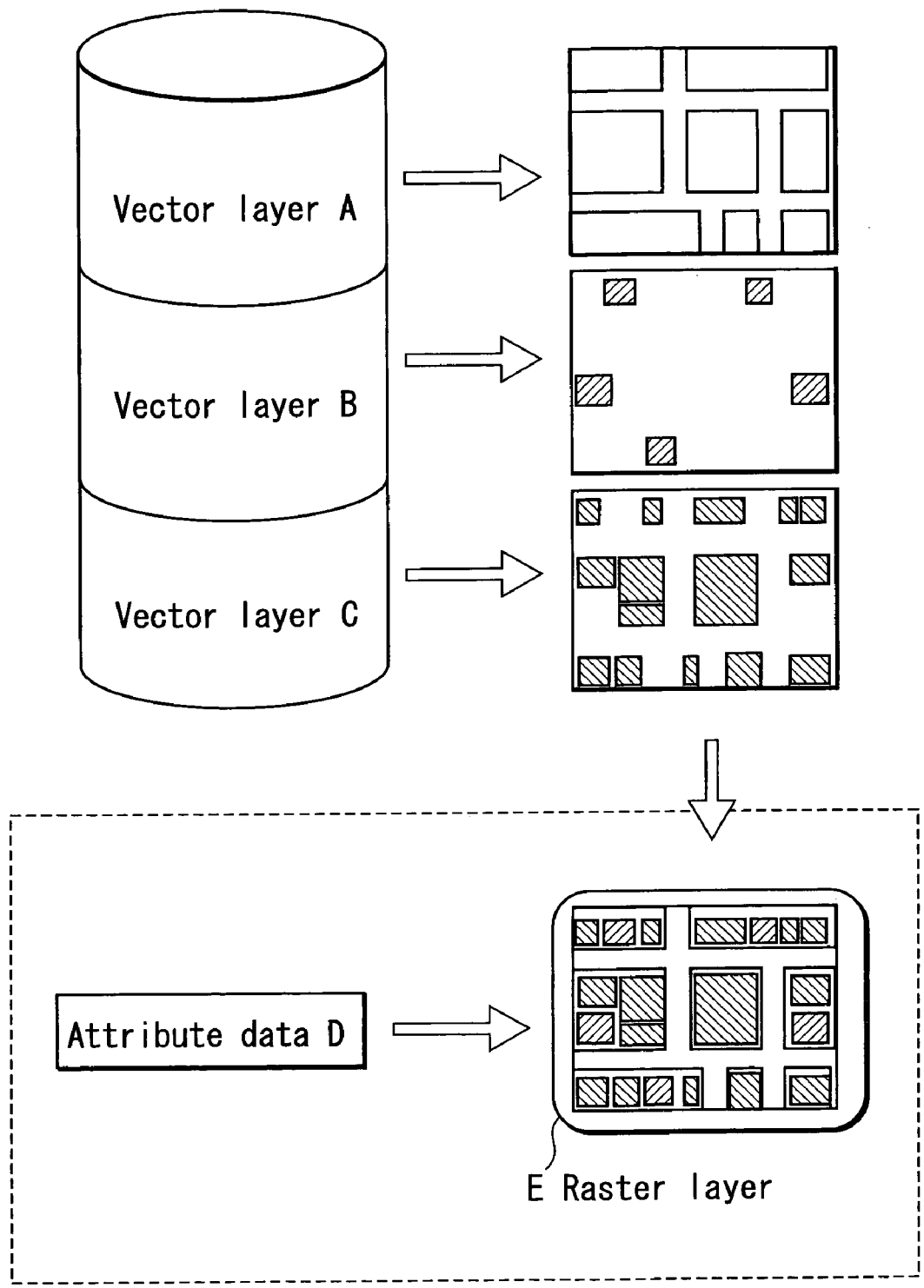
FIG. 4 is a conceptual diagram to explain raster layer producing processing.

First, raster layer creation processing will be described referring to FIG. 4.

Vector layers (numerical data) A to C are stored in various databases of the GIS server 2. The vector layers A to C are expanded on the display memory or the like of the GIS server 2, and image data such as BMP is generated, and then the image data and attribute data D are transmitted to the server 1. In the server 1, the control section 11 utilizes the raster layer creation function 20a to produce raster layers on the basis of the image data and attribute data D. In other words, the raster layers refer to files classified in accordance with the subjects to which information (such as attribute data) attached to the image data is added.

Next, normalization conversion processing will be described referring to FIGS. 5A, 5B, 6A and 6B.

The raster layers shown in FIGS. 5A, 5B have different base points, scales and color designations. Therefore, the base points of the raster layers are checked, and the raster layers are scaled up or down to comply with the scale of map display, and then color is corrected if the color designations are different.

Subsequently, as shown in FIGS. 6A and 6B, coordinates are positioned after the base points of the raster layers are adjusted. The above normalization conversion processing is performed by the control section 11 in accordance with the normalization conversion function 20b of the application program 20.

Next, conversion correction processing will be described referring to FIGS. 7A and 7B.

Here, coordinate conversion is first performed on the basis of latitude and longitude (shear processing) for spherical surface correction and displacement correction (bit data matching conversion). The above conversion correction processing is performed by the control section 11 in accordance with the conversion correction function 20c of the application program 20.

Finally, raster layer transmission processing will be described referring to FIG. 8.

Here, a base map and the raster layers produced as described above are transmitted to the client terminals 3. This raster layer transmission processing is performed by the control section 11 in accordance with the raster layer transmission function 20d of the application program 20.

Figure 9:
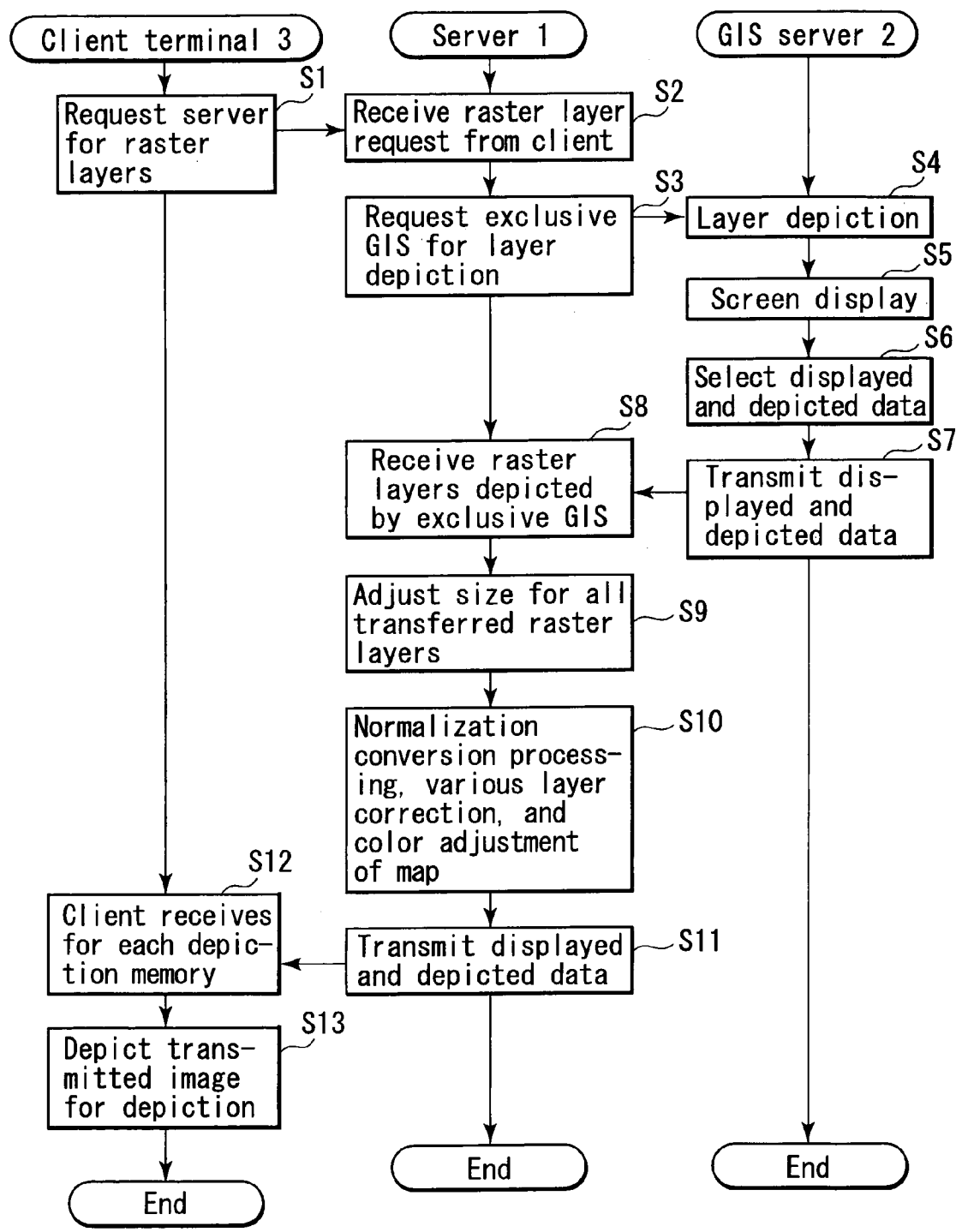
FIG. 9 is a flowchart to explain in detail a series of operations associated with map display of the map display system according to the first embodiment of the present invention.

A series of operations associated with the map display of the map display system according to the first embodiment of the present invention will be explained below in detail referring to a flowchart of FIG. 9.

This corresponds to a map display method according to the first embodiment.

The client terminal 3 makes a data acquisition request for the raster layers to the server 1 (step S1). Receiving the request from the client terminal 3 (step S2), the server 1 makes a raster depiction request to the GIS server 2 (step S3). Receiving the raster depiction request, the GIS server 2 depicts the layers (step S4), displays them on a screen (step S5), receives a selection of displayed and depicted data (step S6), and transmits the displayed and depicted data (step S7). Receiving the image data and attribute data depicted by the GIS server 2 (step S8), the server 1 produces the raster layers with the abovementioned technique, and performs size adjustment (step S9), normalization conversion, various layer corrections and color adjustment (step S10) for all the raster layers, and then transmits the displayed and depicted raster layers to the client terminal 3 (step S11). In this way, the client terminal 3 receives the raster layer for each depiction memory (step S12), and depicts a transmitted image for depiction (step S13).

In addition, an example in which data is transmitted in response to the request from the client terminal 3 has been described above in the flowchart of FIG. 9. However, this is not a limitation, and it is naturally also possible to make a modification such that a voluntary transmission (e.g., batch processing or processing based on a setting for automatic transmission at regular time intervals) from the GIS server 2 causes the client terminal 3 to perform depiction.

As described above, according to the first embodiment of the present invention, the efficiently classified raster layers are transmitted from the server 1 to the client terminal 3, so that transmission and receiving time can be reduced as compared with the case in which the vector layers are transmitted, and moreover, the burden associated with the processing for display on the client terminal is reduced. In addition, also when the aforementioned processing is achieved with a stand-alone map display device, the burden associated with the display processing is reduced, and the map data can be retained in a format suitable for various kinds of processing.

Second Embodiment

Figure 10:
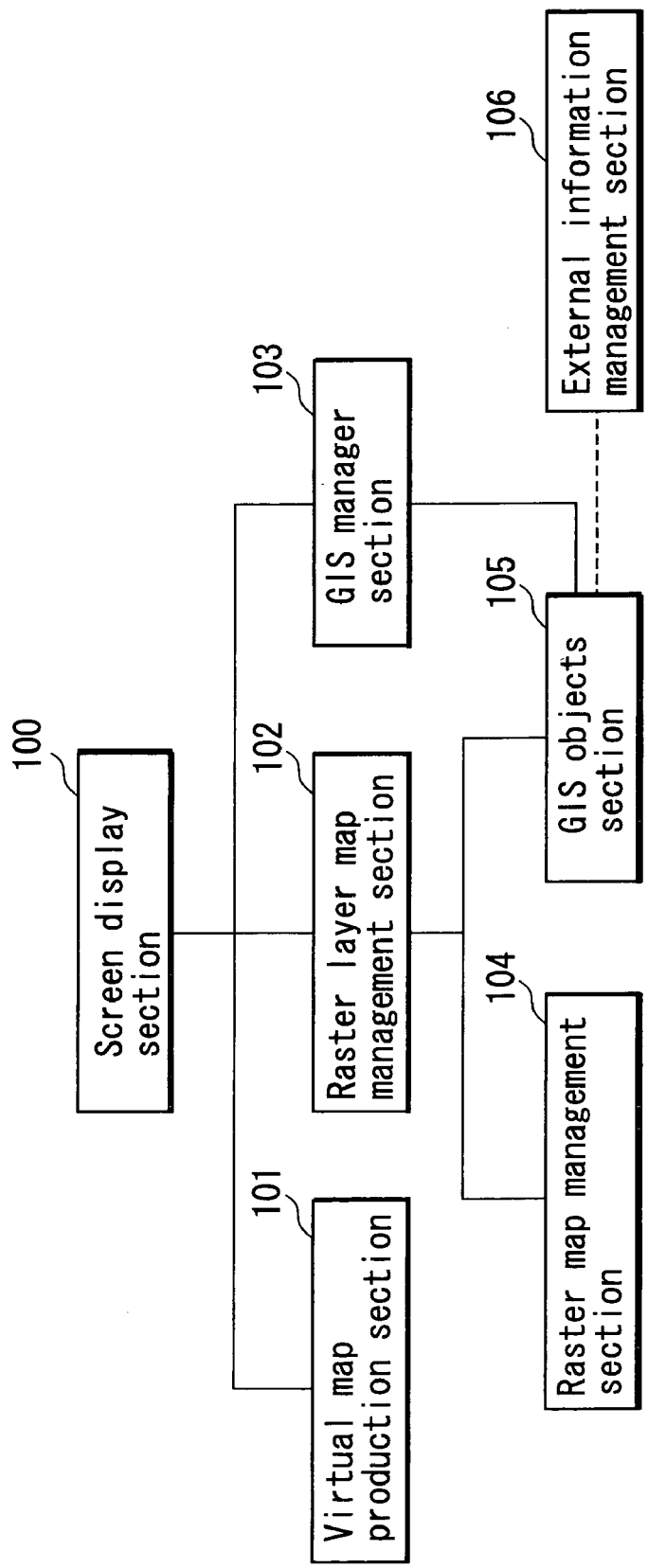
FIG. 10 is a configuration diagram of a hazard support system according to a second embodiment of the present invention.

Next, a hazard support system according to a second embodiment will be described in which the basic configuration of the map display system according to the first embodiment described above is applied to countermeasures against disasters. A configuration of the hazard support system according to the second embodiment is shown in FIG. 10 and will be described. This hazard support system comprises a screen display section 100, a virtual map production section 101, a raster layer map management section 102, a GIS manager section 103, a raster map management section 104, a GIS object section 105 and an external information management section 106.

In such a configuration, the sections 100 to 106 play the following roles:

The screen display section 100 accepts input information from an operator, and displays a result of an operation based on the input information on the screen. The virtual map production section 101 synthesizes a map and disaster information concerning a target area, and sends map information to the screen display section 100. The raster layer map management section 102 combines and manages the map data and disaster information GIS data. The GIS manager section 103 instructs and manages other disaster information GIS systems in obtaining information. The raster map management section 104 manages a base map in the form of raster files, and raster files of the disaster information obtained from the other GIS systems. The GIS object section 105 manages disaster information obtained from the other GIS systems and from the external. The external information management section 106 manages disaster information brought in from other systems, telephone, facsimile, radio, and media news.

Figure 11:
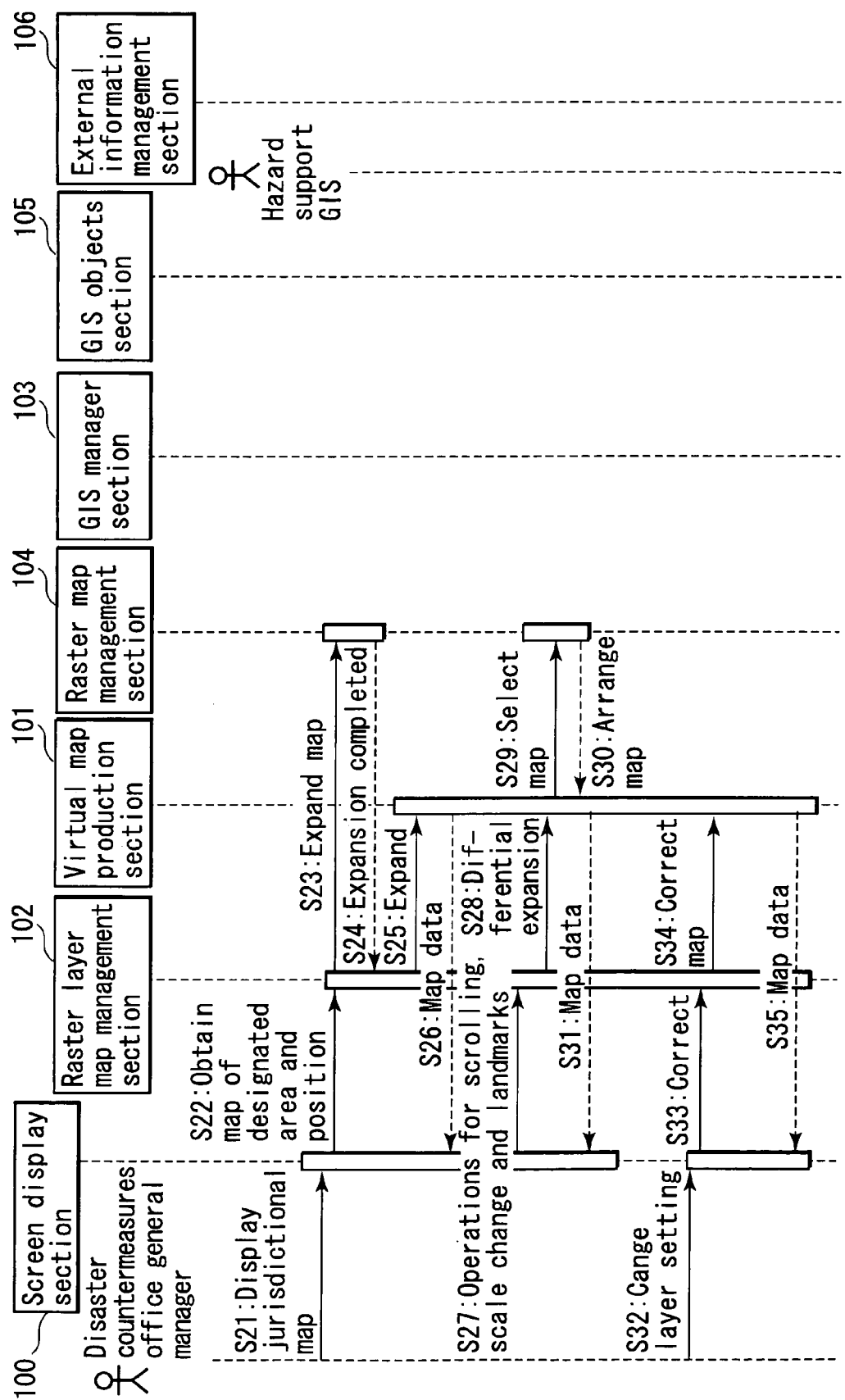
FIG. 11 is a flowchart to explain processing in connection with display of a jurisdictional map, operations such as scrolling on the map, and an operation for changing layer setting, in the hazard support system according to the second embodiment of the present invention.

Processing in connection with display of a jurisdictional map, operations such as scrolling on the map, and an operation for changing layer setting in the hazard support system according to the second embodiment will be explained below referring to a flowchart of FIG. 11.

When a command to display the jurisdictional map of a specific area is input to the screen display section 100 in accordance with an operation of, for example, a disaster countermeasures office general manager (step S21), the screen display section 100 instructs the raster layer map management section 102 to display a map of the designated area and position (step S22). In response to this instruction, the raster layer map management section 102 instructs the raster map management section 104 to expand the map of the specified area (step S23). In response to this instruction, the raster map management section 104 reads the map of the specified area from a disk to prepare for expansion (step S24). After completing the expansion, the raster layer map management section 102 expands the map data in the virtual map production section 101 (step S25). The virtual map production section 101 thus displays the map on the screen display section 100 (step S26).

On the other hand, when operations for scrolling, a scale change and landmarks on the jurisdictional map are performed in accordance with an operation of, for example, the disaster countermeasures office general manager, the screen display section 100 instructs the raster layer map management section 102 to change the position of the designated area and change the scale in order to perform the operations (retrieving and displaying of the designated position) for scrolling, a scale change and landmarks on the map (step S27). The raster layer map management section 102 instructs the virtual map production section 101 to perform differential expansion of the map information in order to correct a display position of the map (step S28). The virtual map production section 101 selects a map of a non-display area for the raster map management section 104 (step S29). The raster map management section 104 prepares to expand the map of the specified area (step S30). The virtual map production section 101 thus displays the map on the screen display section 100 (step S31).

On the other hand, when a command to change layer color setting information is input in accordance with an operation of, for example, the disaster counter-measures office general manager (step S32), the screen display section 100 instructs the raster layer map management section 102 to correct the color of the disaster information displayed on the map (step S33). The raster layer map management section 102 transmits the color-corrected disaster information to the virtual map production section 101 (step S34). The virtual map production section 101 thus displays the map on the screen display section 100 (step S35).

Figure 12:
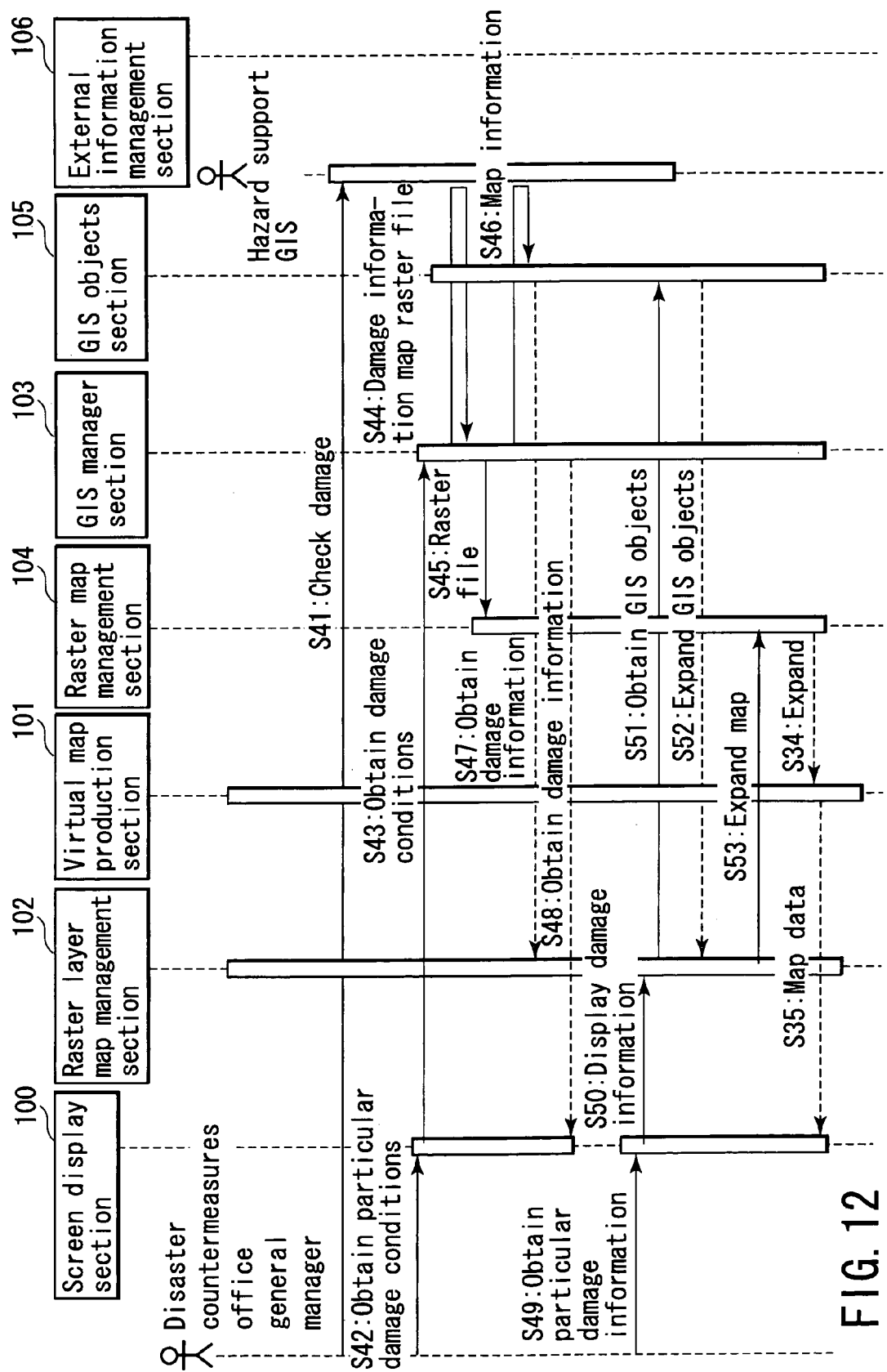
FIG. 12 is a flowchart to explain processing in connection with damage check and display of particular damage information, in the hazard support system according to the second embodiment of the present invention.

Next, processing in connection with damage check and display of particular damage information in the hazard support system according to the second embodiment will be explained referring to a flowchart of FIG. 12.

When the damage information is checked by accessing a hazard support GIS in accordance with an operation of, for example, the disaster countermeasures office general manager (step S41), and, for example, the disaster countermeasures office general manager instructs the screen display section 100 to obtain damage information from the GIS manager section 103 (steps S42, S43), the GIS manager section 103 obtains the damage information and raster layers from the hazard support GIS, and store them in the raster map management section 104 (steps S44, S45). The GIS manager section 103 obtains the raster layers, and stores them in the GIS object section 105 (step S46). Then, the GIS object section 105 will inform the raster layer map management section 102 by way of the GIS manager section 103 that the damage information has been obtained from the hazard support GIS (step S47). The GIS manager section 103 thus informs the screen display section 100 that the damage information has been obtained from the hazard support GIS (step S48).

On the other hand, when a command to display particular damage information is input to the screen display section 100 in accordance with an operation of, for example, the disaster countermeasures office general manager (step S49), the screen display section 100 instructs the raster layer map management section 102 to display the damage information (step S50). In response to this instruction, the raster layer map management section 102 requests the GIS object section 105 to obtain a GIS object (step S51), and expands the GIS object (step S52). The raster layer map management section 102 instructs the raster map management section 104 to expand the map of the damage information (step S53). The raster map management section 104 expands a map file in the virtual map production section 101 (step S54). The virtual map production section 101 thus displays the map on the screen display section 100 (step S55).

Figure 13:
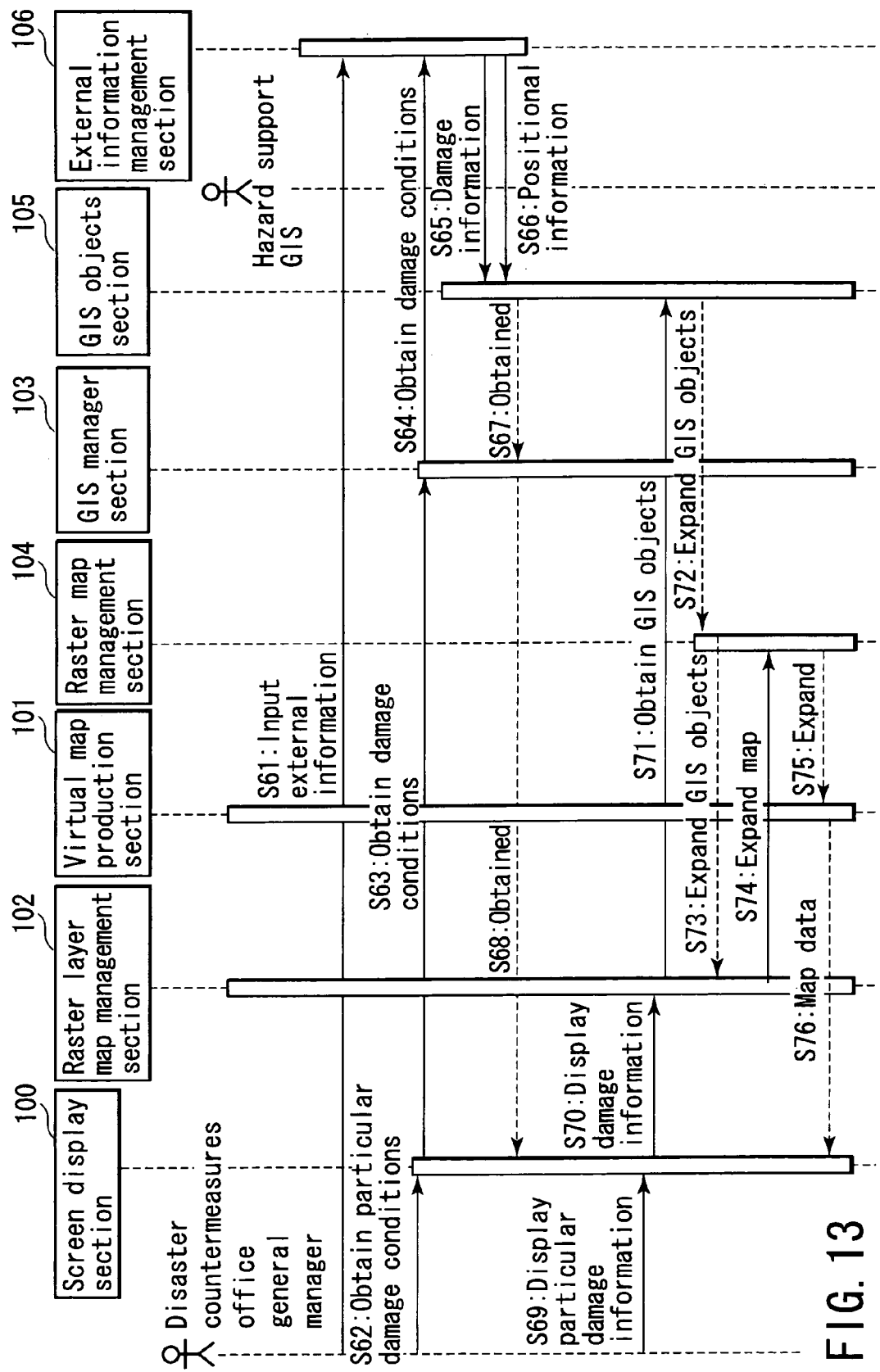
FIG. 13 is a flowchart to explain processing for inputting damage information from external information and displaying the damage information, in the hazard support system according to the second embodiment of the present invention.

Next, processing for inputting damage information from external information and displaying the damage information in the hazard support system according to the second embodiment will be explained referring to a flowchart of FIG. 13.

The damage information is checked by accessing the external information management section 106 in accordance with an operation of, for example, the disaster countermeasures office general manager (step S61). When, for example, the disaster countermeasures office general manager instructs the screen display section 100 to obtain the damage information from the GIS manager section 103 (steps S62, S64), the GIS manager section 103 requests the external information management section 106 to obtain damage conditions (step S63). The GIS manager section 103 obtains damage information and positional information from the external information management section 106 via the GIS object section 105 (steps S65 to S67), and displays them on the screen display section 100 (step S68).

On the other hand, when a command to display particular damage information is input to the screen display section 100 in accordance with an operation of, for example, the disaster countermeasures office general manager (step S69), the screen display section 100 instructs the raster layer map management section 102 to display the damage information (step S70). In response to this instruction, the raster layer map management section 102 requests the GIS object section 105 to obtain a GIS object (step S71), and expands the GIS object (step S72). The raster layer map management section 102 instructs the raster map management section 104 to expand the map of the damage information (step S73). The raster map management section 104 expands a map file in the virtual map production section 101 (step S74). The virtual map production section 101 thus displays the map on the screen display section 100 (steps S75, S76).

Here, examples of how the damage information is obtained are shown in FIGS. 14A and 14B, 15A and 15B, 16A to 16C, and 17A to 17D, and will be explained.

Figure 14A:
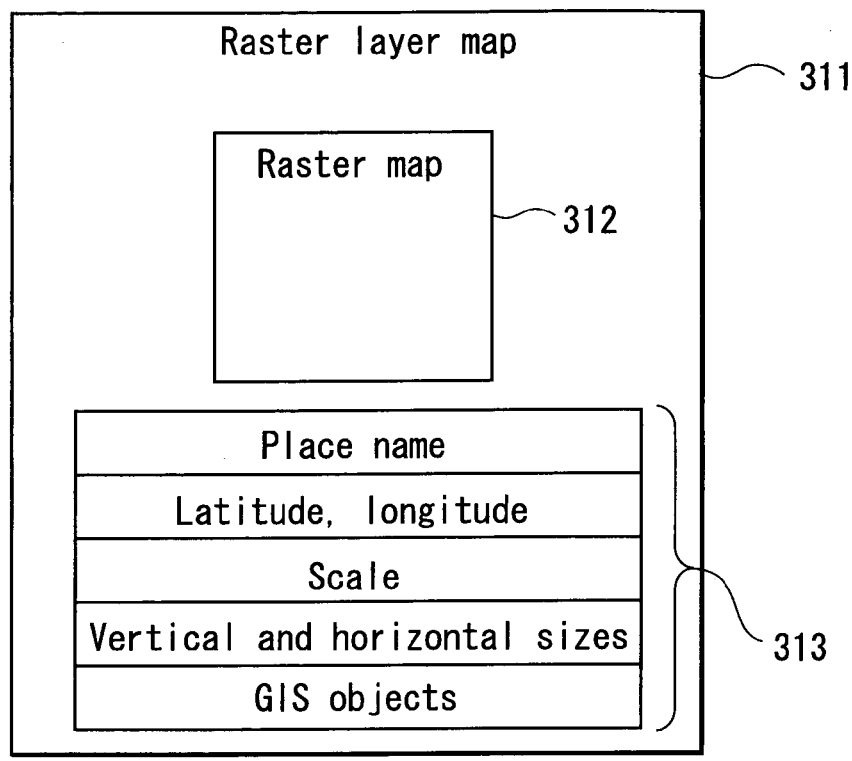
FIGS. 14A and 14B are diagrams showing an example of how the disaster information is obtained, in the hazard support system according to the second embodiment of the present invention.
Figure 14B:
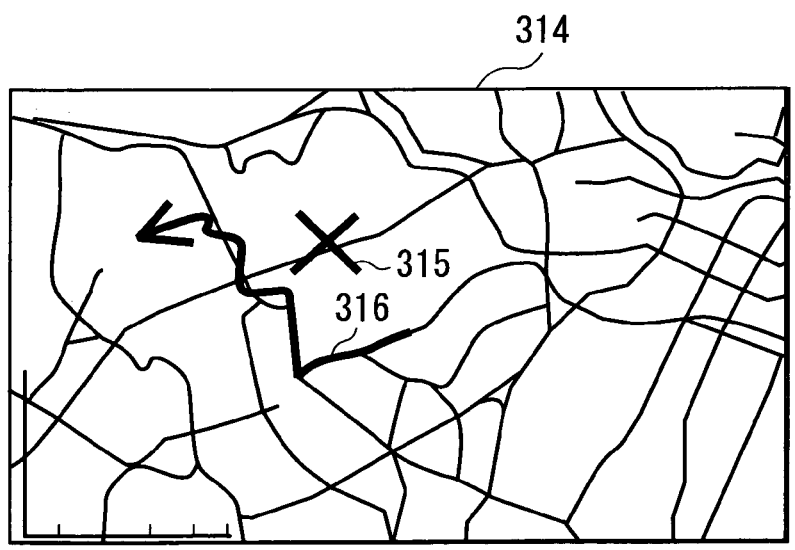

First, in the example shown in FIG. 14A, a raster layer 311 includes image data 312 and attribute data 313. The attribute data 313 includes a place name, latitude, longitude, scale, vertical and horizontal sizes, and a GIS object. A display based on the attribute data 313 is as shown in FIG. 14B. In this example, the disaster information is stored in the GIS object, and a road cave-in place 315 (x mark) and a detour 316 (curve) are displayed in a map 314 on the basis of the disaster information.

Figure 15A:
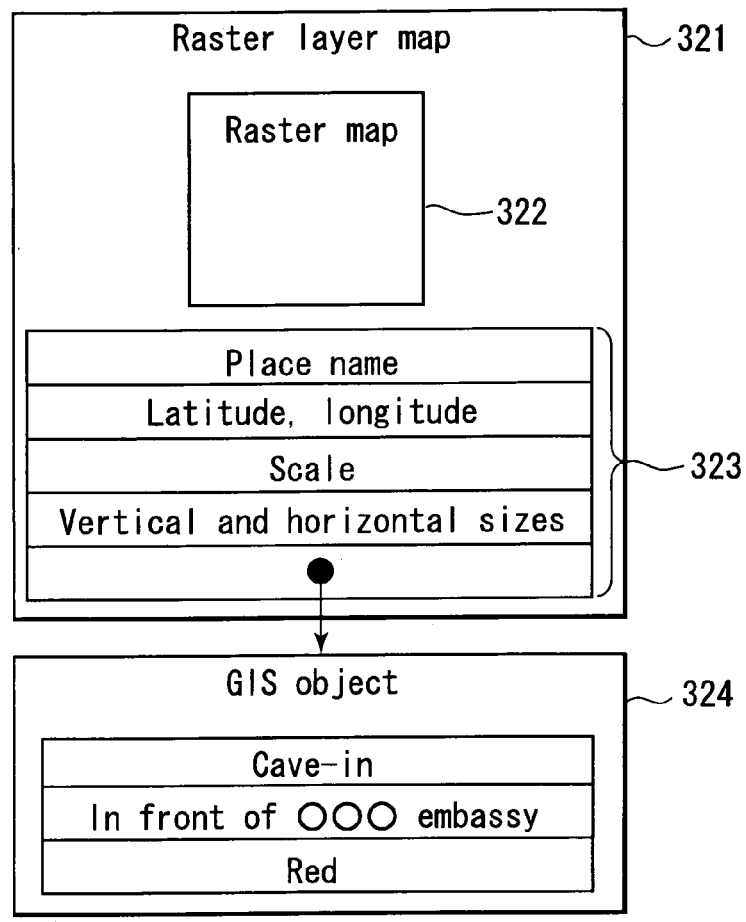
FIGS. 15A and 15B are diagrams showing an example of how the disaster information is obtained, in the hazard support system according to the second embodiment of the present invention.

Next, in the example shown in FIG. 15A, a raster layer 321 includes image data 322 and attribute data 323. A GIS object 324 of the attribute data 323 includes, as the disaster information:

Disaster kind . . . cave-in

Positional information . . . OOO embassy

Color information on the map . . . red.

Figure 15B:
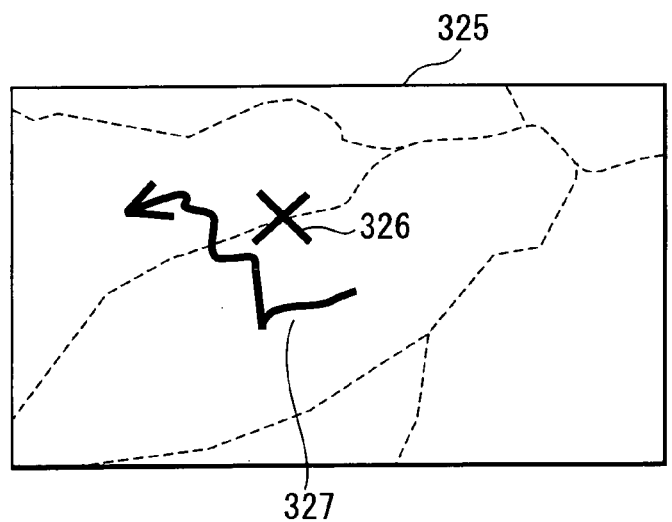

A display based on the raster layer 321 is shown in FIG. 15B. In this example, a road cave-in place 326 (x mark) and a detour 327 (curve) are displayed in a map 327.

Figures 16A, 16B, 16C:
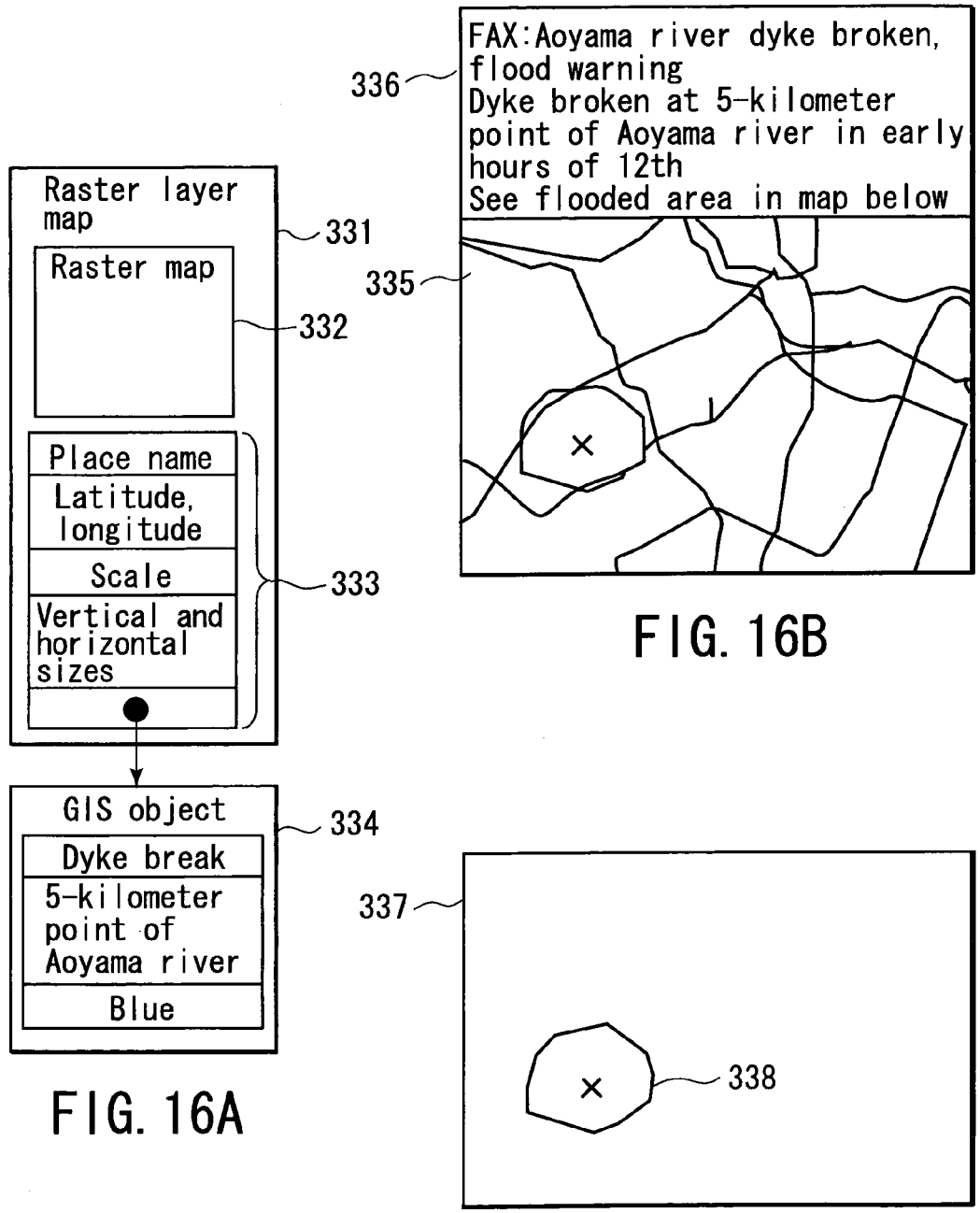
FIGS. 16A to 16C are diagrams showing an example of how the disaster information is obtained, in the hazard support system according to the second embodiment of the present invention.

On the other hand, in the example shown in FIG. 16A, a raster layer 331 includes image data 332 and attribute data 333. Further, from flood damaged area information in accordance with a FAX 336 shown in FIG. 16B, a flooded area 338 on a map 335 of the FAX is extracted, and a map 337 including the flooded area 338 shown in FIG. 16C is stored as the image data 332. In this case, the attribute data 333 includes a place name, latitude, longitude, scale, vertical and horizontal sizes, and a GIS object 334, and the GIS object 334 stores information that the flooded area is painted blue with a message, for example, "dyke broken at a 5-kilometer point of Aoyama river".

Figure 17A:
FIGS. 17A to 17D are diagrams showing an example of how the disaster information is obtained, in the hazard support system according to the second embodiment of the present invention.
Figure 17B:
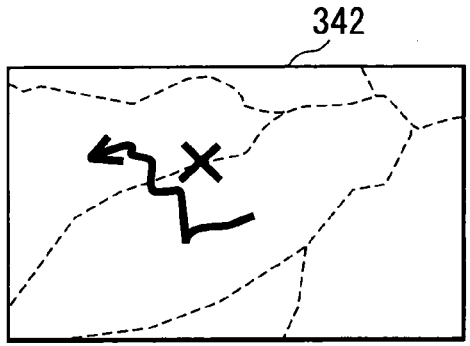
Figure 17C:
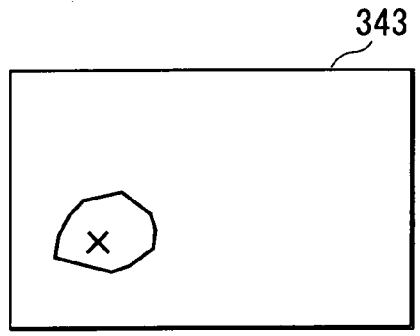
Figure 17D:

Finally, how the base map and raster layer maps are superimposed will be explained referring to FIGS. 17A to 17D. FIG. 17A shows a base map 341, and the positional information indicates a central point (x mark) of the map. FIG. 17B shows an example of disaster information sent from the GIS server, and the positional information of a raster layer map 342 indicates a cave-in point (x mark). FIG. 17C shows an example of disaster information obtained from the outside, and the positional information of a raster layer map indicates a dyke break point (x mark). Then, the base map and the raster layer maps are superimposed on the basis of the positional information, thereby displaying a map reflecting the disaster information as shown in FIG. 17D.

As described above, with the hazard support system according to the second embodiment of the present invention, the efficiently classified raster layers can be used to properly display the disaster information and the like. At the same time, since the raster layers are used, the burden associated with the display processing by the screen display section 100 is reduced.

While the embodiments of the present invention have been described above, the present invention is not limited thereto, and can be variously modified and changed without departing from its spirit. The present invention can also be implemented as a recording medium recording the application program.

Furthermore, a communication can be performed with a data container in which the attribute data is incorporated in the image data. In this case, internal processing in the data container is adequate even when a communication format is changed, so that the burden associated with processing of systems and terminals is reduced.

As described above in detail, according to the present invention, it is possible to provide a map display device, a map display system, a map display method and a map display program which convert map data managed in different formats in different geographic information systems into raster data, and subject it to various kinds of processing to produce raster layers for freer use of the map data, such as processing and editing of the map data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A map display device connected to a map information system server and a client terminal so as to be able to communicate with each other, the device comprising:
   a communication section which communicates with the map information system server and the client terminal;
   a storage section which stores data received via the communication section;
   a control section which controls to adjust image data received in the communication section in accordance with attribute data to produce raster layers, and subject a plurality of raster layers to predetermined processing including normalization conversion processing and conversion correction processing, and then transmit the raster layers to the client terminal via the communication section.

2. A map display system comprising:
   a map information system server;
   a map display device;
   and the map information system server further comprising:
   a first communication section which communicates with the map display device;
   a first control section which controls to generate image data based on raster data, and transmit the image data to the map display device together with attribute data via the first communication section;
   and the map display device further comprising:
   a second communication section which communicates with the map information system server and a client terminal;
   a storage section which stores at least the image data and attribute data received via the second communication section; and
   a second control section which controls to adjust the image data in accordance with the attribute data to produce raster layers, and subject a plurality of raster layers to predetermined processing including normalization conversion processing and conversion correction processing, and then transmit the raster layers to the client terminal via the second communication section.

3. A map display system comprising:
   a map information system server;
   a map display device;
   and the map information system server further comprising:
   a database which stores at least vector data;
   a first communication section which communicates with the map display device;
   a first control section which controls to read the vector data from the database in response to a request from the map display device, and transmit the vector data to the map display device via the first communication section;
   and the map display device further comprising:
   a second communication section which communicates with the map information system server and a client terminal;
   a storage section which stores at least the vector data received by the second communication section; and
   a second control section which controls to generate image data based on raster data from the vector data, and adjust the image data in accordance with attribute data to produce raster layers, and subject a plurality of raster layers to predetermined processing including normalization conversion processing and conversion correction processing, and then transmit the raster layers to the client terminal via the second communication section.

4. A map display method by a map display system having a map information system server, and a map display device connected to the map information system server and to a client terminal so as to be able to communicate with each other, the method comprising:
   generating image data based on raster data, and transmitting the image data to the map display device together with attribute data via a first communication section, by the map information system server;
   controlling to adjust the image data in accordance with the attribute data to produce raster layers, and subject a plurality of raster layers to predetermined processing including normalization conversion processing and conversion correction processing, and then transmit the raster layers to the client terminal via a second communication section, by the map display device.

5. A map display method by a map display system having a map information system server, and a map display device connected to the map information system server and to a client terminal so as to be able to communicate with each other, the method comprising:
   reading vector data from a database, generating image data based on raster data, and transmitting the image data together with attribute data to the map display device via a first communication section, by the map information system server;
   controlling to adjust the image data in accordance with the attribute data to produce raster layers, and subject a plurality of raster layers to predetermined processing including normalization conversion processing and conversion correction processing, and then transmit the raster layers to the client terminal via a second communication section, by the map display device.

6. A map display method by a map display system having a map information system server, and a map display device connected to the map information system server and to a client terminal so as to be able to communicate with each other, the method comprising:

reading vector data from a database in response to a request from the map display device, and transmitting the vector data to the map display device via a first communication section, by the map information system server;

generating image data based on raster data in accordance with the vector data received by a second communication section, and adjusting the image data in accordance with attribute data to produce raster layers, and subjecting a plurality of raster layers to predetermined processing including normalization conversion processing and conversion correction processing, and then transmitting the raster layers to the client terminal via the second communication section, by the map display device.

* * * * *